United States Patent [19]
Bardet et al.

[11] Patent Number: 5,248,407
[45] Date of Patent: Sep. 28, 1993

[54] STORAGE STABLE POLYMER MODIFIED ASPHALT PAVING BINDER

[75] Inventors: Jacques G. Bardet, Paris, France; Martin L. Gorbaty, Westfield; Nicholas C. Nahas, Chatham, both of N.J.

[73] Assignee: Exxon Research and Engineering Company, Florham Park, N.J.

[21] Appl. No.: 914,073

[22] Filed: Jul. 16, 1992

[51] Int. Cl.$^5$ .................. C08L 95/00; C08L 9/00
[52] U.S. Cl. ........................ 208/22; 208/23; 208/44; 106/273.1; 106/274; 524/64; 524/69; 524/70; 524/71
[58] Field of Search .............. 208/22, 23, 44; 106/273.1, 274; 524/64, 69, 70, 71

[56] References Cited

U.S. PATENT DOCUMENTS

| | | | |
|---|---|---|---|
| 3,642,728 | 2/1972 | Canter | 260/79.3 |
| 3,836,511 | 9/1974 | O'Farrell et al. | 260/79.3 |
| 4,371,641 | 2/1983 | Boyer et al. | 524/70 |
| 4,738,997 | 4/1988 | Lundberg et al. | 524/71 |
| 4,868,233 | 9/1989 | Moran | 524/62 |
| 4,873,275 | 10/1989 | Moran et al. | 524/64 |
| 5,070,123 | 12/1991 | Moran | 524/71 |
| 5,095,055 | 3/1992 | Moran | 524/71 |

Primary Examiner—Theodore Morris
Assistant Examiner—P. L. Hailey
Attorney, Agent, or Firm—John W. Ditsler; James H. Takemoto

[57] ABSTRACT

Paving binders, especially hot mix paving mixtures, having excellent storage stability, reduced binder run-off, and high temperature viscosity are formed by adding a copolymer of ethylene with an alkyl acrylate or vinyl acetate and a neutralized sulfonated polymer to the asphalt. Preferably, the alkyl acrylate is methyl acrylate and the neutralized sulfonated polymer is a terpolymer of ethylene, propylene, and a diene monomer.

11 Claims, No Drawings

STORAGE STABLE POLYMER MODIFIED ASPHALT PAVING BINDER

BACKGROUND OF THE INVENTION

1. Field of the Invention

This invention relates to a storage stable, polymer-modified asphalt paving binder and a pavement mixture containing the binder.

2. Discussion of Related Art

Asphalt binders for open graded hot mix pavement typically contain from about 15 to about 20 wt. % reclaimed tire rubber to ensure proper viscosity for flow resistance and ease of handling during construction. However, such binders have the disadvantage of emitting fumes from the hydrocarbon process oil used in making the tires. As such, it would be desirable to have available an asphalt paving binder that had the proper viscosity and ease of handling features associated with rubber modified paving binders but did not contain the hydrocarbon process oil.

Frequently, polymeric materials have been added to asphalt products to enhance their rheological properties, i.e., to improve its creep resistance above about 20° C. (See, for example, U.S. Pat. No. 4,371,641, which discloses that roofing bitumen containing a neutralized sulfonated terpolymer such as a terpolymer of ethylene, propylene, and a diene monomer (EPDM) has excellent oxidation stability, U.V. stability, and good creep resistance.) Polymer modified asphalts must also have good phase compatibility between the asphalt and polymer, and be storage stable at high temperatures for ease of handling and application. Compatibility between the polymer and asphalt is very important to ensure that the properties of both are transferred to the finished product for good long term performance. Poor storage stability will render the polymer modified asphalt less desirable for use in paving binder applications, roofing applications, and other industrial specialty products. (See, for example, U.S. Pat. No. 4,873,275, which discloses that paving binders can be made storage stable and more creep resistant by the addition of a copolymer of ethylene with vinyl acetate, alkyl acrylate, or alkyl methacrylate).

However, neither patent nor the references cited therein (all of which are incorporated herein by reference) discloses the particular asphalt paving binder described below.

SUMMARY OF THE INVENTION

In one embodiment, this invention concerns a storage stable polymer modified paving binder which comprises (a) asphalt, (b) from about 2 to about 7 wt. % of a copolymer of ethylene with from about 5 to about 40 wt. % of an alkyl acrylate or vinyl acetate, wherein the copolymer has a Melt Index ranging from about 0.3 to about 20 g/10 mins, and (c) from about 0.5 to about 2 wt. % of a neutralized sulfonated polymer.

In another embodiment, this invention concerns a pavement structure containing the binder described above. In yet another embodiment, this invention concerns a method of improving the storage stability of ethylene copolymer modified asphalt paving binders by incorporating therein the neutralized sulfonated polymer as described in (b) and (c) above.

DETAILED DESCRIPTION OF THE INVENTION

This invention contains asphalt, an ethylene-alkyl acrylate ethylene-vinyl acetate copolymer, and a neutralized sulfonated polymer.

The asphalt used in this invention is a viscoelastic semisolid derived from crude petroleum by distillation, solvent fractionation, oxidation, or a combination thereof having a penetration grade between 5 and 300 at 25° C. The penetration grade is defined by ASTM Standard Test Method D-5 in which a needle of specified geometry driven by a 100 g weight is allowed to penetrate the asphalt sample for 5 seconds. The penetration grade is the depth of penetration in decimillimeters.

Typically, the asphalt used in this invention will contain from about 5 to about 25 wt. % asphaltenes, which are the heptane insolubles portion of the asphalt as determined by ASTM D-3279. Lower asphaltene containing asphalts (e.g. asphalts having less than 7 wt. % asphaltenes) are generally more compatible with polymers than asphalts having at least 7 wt. % asphaltenes. Accordingly, this invention is particularly applicable to asphalts having at least 7 wt. %, preferably at least 10 wt. %, asphaltenes.

The copolymer used in this invention is a copolymer of ethylene and from about 5 to about 40 wt. %, preferably from about 20 to about 30 wt. %, of an alkyl acrylate or vinyl acetate. Preferably, the alkyl group in the alkyl acrylate will be methyl, ethyl, or butyl, with methyl being most preferred. The copolymer should have a Melt Index ranging from about 0.3 to about 20 g/10 mins., preferably from about 0.5 to about 10 g/10 mins., and most preferably from about 0.8 to about 2 g/10 mins.

The amount of copolymer added to the asphalt should range from about 2 to about 7 wt. %, most preferably from about 3 to about 5 wt. %. An amount below about 2 wt. % will result in a paving binder having a low viscosity which will not adhere to the stone aggregate, while amounts greater than about 7 wt. % will result in a costly product which is brittle at low temperature, thereby rendering the product impractical and unsuitable for use as a paving binder, particularly a hot mix paving binder.

The neutralized sulfonated polymers of this invention are derived from either thermoplastic or elastomeric polymers having either olefinic or aromatic unsaturation sites. In particular, unsaturated elastomeric polymers include low unsaturated polymers such as butyl rubber and EPDM, and high unsaturation polymers such as polybutadiene, polyisoprene, and styrene-butadiene copolymers including styrene-butadiene linear diblock and styrene-butadiene-styrene radial and triblock copolymers. In addition to these elastomers, suitable sulfonic acid-containing copolymers may be prepared from plastic polymers prepared by the polymerization of ethylene or propylene with multiolefins such as 1,4-hexadiene, dicyclopentadiene, norbornadiene, 5-methylene-2-norbornene, 5-ethylidene-2-norbornene, 5-propenyl-2-norbornene and 1,5-cyclooctadiene. Preferably, these polymers have incorporated therein about 0.2 to about 10 mole percent unsaturation, more preferably about 0.5 to about 6 percent. The preferred polymers are based on EPDM.

Sulfonated polymers are prepared by any means well known to those skilled in the art. For example, sulfonation of polymers may be accomplished by any suitable sulfonating agent, e.g., acetyl sulfate as disclosed in U.S. Pat. Nos. 3,642,728 and 3,836,511 which are incorporated herein by reference. The sulfonated polymers are then neutralized by a neutralizing agent. The neutralizing agents are basic compounds selected from the group consisting of ammonium and Groups IA, IIA, IB-VIIB and VIII of the Periodic Table of Elements. Preferred neutralizing agents contain monovalent or preferably divalent cations. Especially preferred cations are $Zn^{2+}$, $Ca^{2+}$, $Ba^{2+}$ or $Mg^{2+}$ Suitable basic neutralizing agents are, for example, zinc oxide, calcium oxide, zinc acetate, barium oxide, magnesium oxide, barium hydroxide and the like. The neutralized sulfonated polymer has from about 5 to about 50 meq. of sulfonate per 100 grams of neutralized sulfonated polymer, at least about 95 percent of the sulfonate groups being neutralized as described above.

The term "EPDM" is used in the sense of its definition as found in ASTM D-1418-64, and is intended to mean a terpolymer containing ethylene and propylene in the backbone, and unsaturation in the side chain. Methods for producing these terpolymers are found in U.S. Pat. No. 3,280,082, British Patent 1,030,289 and French Patent 1,386,600, the disclosures of which are incorporated herein by reference. The preferred polymers contain from about 45 to about 80 wt. % ethylene and from about 1 to about 10 wt. % of a diene monomer, with the balance of the polymer being propylene. Preferably, the polymer contains from about 50 to about 70 wt. % ethylene (e.g., about 60 wt. %) and from about 1.0 to about 8.0 wt. % diene monomer (e.g., 4.5 wt. %). The diene monomer is preferably a non-conjugated diene.

Examples of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene and methyl tetrahydroindene.

Though the term "olefinic unsaturation" does not include aromatic unsaturation, the polymer backbone may contain aromatic rings either within the backbone structure or pendant therefrom, for example styrene-butadiene. Sulfonation, however, is preferentially carried out at the site of olefinic unsaturation rather than on the aromatic rings.

The ethylene copolymer provides improved workability to the asphalt, particularly in the hot mixing operation, and contributes to the ambient temperature viscosity without stiffening the asphalt at low temperatures. However, the ethylene copolymer does not form storage stable blends with all asphalts. Surprisingly, it has been found that addition of minor amounts of a neutralized sulfonated polymer along with the ethylene copolymer imparts storage stability. In addition, high temperature viscosity and low temperature elastomeric properties are imparted to the blend.

The asphalt may be mixed or blended with the ethylene copolymer and the neutralized sulfonated polymer in any number of ways which can readily be selected by one skilled in the art. Suitable means include external mixers, roll mills, internal mixers, Banbury mixers, screw extruders, augers and the like. Blending times can range broadly; i.e. from about 1 hour to about 8 hours or more. Typically, blending times of about 1 to about 4 hours will be employed.

Similarly, the particular conditions at which the asphalt is blended with the copolymer and neutralized sulfonated polymer are not critical. Typically, the blending will be performed at ambient pressure and at a temperature between about 150° and about 250° C., preferably between about 180° and about 220° C.

The polymer modified asphalt thus formed may be employed in essentially any application requiring asphalt-based products with superior storage stability. Examples of such applications include adhesives, coatings, fabricated products, road and roofing applications, sealants, sound and vibration dampening products, water proofing membranes and the like. However, the final product is particularly well suited for use as a paving binder, particularly a binder in the top or surface course of pavement structures, particularly open graded hot mix pavement structures.

This invention will be further understood by reference to the following Example, which contains a preferred embodiment of this invention. In the Example, the viscosity, elongation, storage stability, and runoff of the paving binders tested were measured as follows:

Viscosity was measured by ASTM D-2170 which is a kinematic viscosity.

Elongation was measured by gripping a 3 cm long molded specimen with a 0.4 cm by 0.4 cm cross-section between clamps in a tensile testing machine fixture. The sample is elongated at a rate of 1 cm/min at −10° C. until the sample breaks or elongates to 1000% without breaking.

Storage Stability was measured by taking a sample of the asphalt polymer blend in a test tube and allowing the sample to stand at 160° C. for 5 days without agitation. The sample is then chilled and cut into thirds. The softening point of the top and bottom thirds are measured. If they agree to within 3° C., the sample is storage stable.

Binder Runoff was measured by holding a sample of open graded hot mix containing 6% binder and 94% aggregate of ⅜" stone on a screen with ⅜" openings for 4 hours at 175° C. The weight of binder passing through the screen is reported as a percentage of total binder.

EXAMPLE

The properties of various unmodified and modified asphalt paving binders were determined. The results of these tests are shown in Table 1 below;

TABLE 1

| Property | Target | Binder (1) | (2) | (3) | (4) |
|---|---|---|---|---|---|
| Viscosity at 160° C. | <200 cSt >1000 cSt | 200 | 4000 | 800 | 1300 |
| Elastomeric at low temperature | Elongation before break >300% at −10° C. | 0 | 400 | 300 | 500 |
| Storage stable | No separation on Standing 5 days at 160° C. | Yes | No | No | Yes |
| Binder runoff | <5% in 4 hrs at 175° C. | >20% | 0% | 8% | 0.3% |

(1) A 90 penetration straight run asphalt having an asphaltene content of 11.7 wt. % asphaltenes.
(2) The asphalt of (1) modified with 15 wt. % reclaimed tire rubber.
(3) The asphalt of (1) modified with 4.0 wt. % of a copolymer of ethylene and methyl acrylate.
(4) The asphalt of (3) further modified with 1.0 wt. % of sulfonated EPDM.

The data in Table 1 show that only binder (4), the binder of this invention, meets the target specifications shown.

What is claimed is:

1. A storage stable asphalt paving binder which comprises (a) asphalt having at least 10 wt. % asphaltenes,
   (b) from about 2 to about 7 wt. % based on asphalt of a copolymer of ethylene with from about 5 to about 40 wt. % based on copolymer of an alkyl acrylate or vinyl acetate, wherein the copolymer has a Melt Index ranging from about 0.3 to about 20 g/10 mins., and
   (c) from about 0.5 to about 2 wt. % based on asphalt of a neutralized sulfonated polymer.

2. The binder of claim 1 wherein the alkyl in the alkyl acrylate is methyl, ethyl, or butyl.

3. The binder of claim 2 wherein the neutralized sulfonated polymer has from about 5 to about 50 meq. of sulfonate groups per 100 grams of said neutralized sulfonated polymer, at least 95 percent of said sulfonate groups being neutralized with a counterion being selected from the group consisting of ammonium and Groups IA, IIA, IB-VIIB and VIII of the Periodic Table of Elements.

4. The binder of claim 3 wherein the alkyl acrylate is methyl acrylate.

5. The binder of claim 4 wherein the polymer in (c) is a terpolymer of ethylene, propylene, and a diene monomer.

6. The binder of claim 5 wherein the polymer in (c) comprises from 45 to 80 wt. % ethylene, from 1 to 10 wt. % of a diene monomer, with the balance being propylene.

7. The binder of claim 6 wherein the polymer in (c) is a zinc neutralized sulfonated polymer.

8. The binder of claim 3 wherein counterion is zinc, calcium, barium or magnesium.

9. A pavement structure containing the asphalt paving binder of claim 1.

10. The pavement structure of claim 9 wherein the alkyl in the alkyl acrylate is methyl, ethyl, or butyl and the neutralized sulfonated polymer has from about 5 to about 50 meq. of sulfonate groups per 100 grams of said neutralized sulfonated polymer, at least 95 percent of said sulfonate groups being neutralized with a counterion being selected from the group consisting of ammonium and Groups IA, IIA, IB-VIIB and VIII of the Periodic Table of Elements.

11. A method for improving the storage stability of an asphalt paving binder which comprises:

(a) providing an asphalt having at least 10 wt. % asphaltenes, and
   (b) incorporating into said asphalt
      (1) from about 2 to about 7 wt. % based on asphalt of a copolymer of ethylene with from about 5 to about 40 wt. % based on copolymer of an alkyl acrylate or vinyl acetate, wherein the copolymer has a Melt Index ranging from about 0.3 to about 20 g/10 mins., and
      (2) from about 0.5 to about 2 wt. % based on asphalt of a neutralized sulfonated polymer.

* * * * *